United States Patent
Oh et al.

(10) Patent No.: US 6,307,033 B1
(45) Date of Patent: Oct. 23, 2001

(54) REACTIVE BLUE DYES CONTAINING MONOCHLOROTRIAZINE AND ACETOXYETHYL SULFONE GROUPS

(75) Inventors: Sea Wha Oh; Myeong Nyeo Kang; Tae Kyung Kim, all of Daejeon (KR)

(73) Assignee: Korea Research Institute of Chemical Technology (KR)

( * ) Notice: Subject to any disclaimer, the term of this patent is extended or adjusted under 35 U.S.C. 154(b) by 0 days.

(21) Appl. No.: 09/646,936
(22) PCT Filed: Mar. 26, 1999
(86) PCT No.: PCT/KR99/00143
§ 371 Date: Nov. 20, 2000
§ 102(e) Date: Nov. 20, 2000
(87) PCT Pub. No.: WO99/48984
PCT Pub. Date: Sep. 30, 1999

(30) Foreign Application Priority Data
Mar. 26, 1998 (KR) .................................. 98/10609

(51) Int. Cl.$^7$ .......................... C09B 33/10; C09B 39/00
(52) U.S. Cl. ............................................ 534/582; 534/637
(58) Field of Search ....................... 534/582, 637

(56) References Cited

U.S. PATENT DOCUMENTS 4,412,948 * 11/1983 Omura et al. .................. 534/637

FOREIGN PATENT DOCUMENTS

| 2929 107 | 1/1980 | (DE) . |
| 87 113 A1 | 8/1983 | (EP) . |
| 08-122354 | 5/1996 | (JP) . |

* cited by examiner

Primary Examiner—Fiona T. Powers
(74) Attorney, Agent, or Firm—Finnegan, Henderson, Farabow, Garrett & Dunner, LLP

(57) ABSTRACT

The present invention relates to a bifunctional blue reactive dye and more particularly, to the bifunctional blue reactive dye with monochlorotriazine and acetoxyethylsulfone as reactive groups expressed by formula (1), wherein, M is alkaline metal atom, and which provides excellent combination of properties in that 1) the introduction of aminophenyl-β-acetoxyethylsulfone group to the dye may minimize the loss of dye, since its low solubility to water lessens the amount of the remaining solution during filtration, 2) an easier salting-out process requires a smaller amount of salt during the process so that the costs for the treatment of waste water may be significantly reduced, and 3) a better dyeing yield with enhanced substantivity and better brightness in color.

2 Claims, No Drawings

REACTIVE BLUE DYES CONTAINING MONOCHLOROTRIAZINE AND ACETOXYETHYL SULFONE GROUPS

BACKGROUND OF THE INVENTION

1. Field of the Invention

The present invention relates to a bifunctional blue reactive dye and more particularly, to the bifunctional blue reactive dye with monochlorotriazine and acetoxyethylsulfone as reactive groups expressed by the following formula 1, which provides excellent combination of properties in that 1) the introduction of aminophenyl-β-acetoxyethylsulfone group to the dye may minimize the loss of dye, since its low solubility to water lessens the amount of the remaining solution during filtration, 2) an easier salting-out process requires a smaller amount of salt during the process so that the costs for the treatment of waste water may be significantly reduced, and 3) a better dyeing yield with enhanced substantivity and better brightness in color.

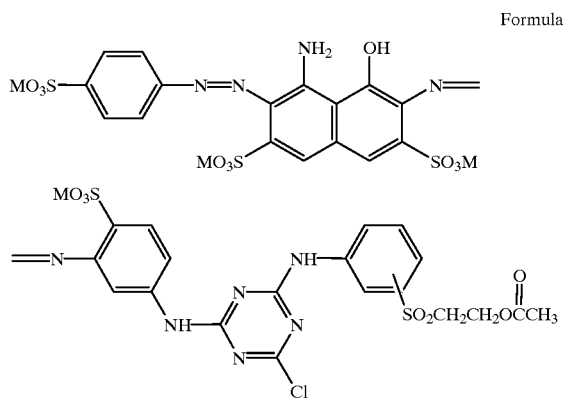

Formula 1 wherein, M is alkaline metal atom.

2. Description of the Related Art

The salting-out process is being currently performed as a method of isolating a dye from the reaction mixture after a reactive dye is synthesized. However, in the case of synthesizing a dye with an aminophenyl-β-sulfatoethylsulfone compound as an intermediate for the manufacture of a vinylsulfone reactive dye, a method of isolating a dye from the reaction mixture is carried out based on a spray drying or in the presence of a large amount of salts owing to the fact that a higher solubility of the dye to water makes it difficult to perform the salting-out process. These methods have brought about the environmental pollution, and the cost for the treatment of waste water containing a very high concentration of residual dye becomes enormous.

In particular, a blue reactive dye containing an aminophenyl-β-sulfatoethylsulfone compound has a poor substantivity due to its high solubility to water.

Under the current situation where the developed countries such as Europe and U.S.A. has strictly regulated the amount of salt in waste water containing a dye, intensive researches have focused on the manufacture of a low-salt dye and thus, these dyes have been commercialized in a continual manner. There is an increasing trend in favor of the use of a liquid dye in an effort to protect an operator's health and to meet an accurate content of dye in keeping pace with the automatic dyeing process. Thus, the use of a high-concentration dye without any salt should be essential for the manufacture of a stable liquid dye.

Since the solubility of an aminophenyl-β-acetoxyethylsulfone compound, expressed by the following formula 2, is a relatively lower than that of an aminophenyl-β-sulfatoethylsulfone, the synthesis of a blue reactive dye using the former as a reacting group has an advantage in that the salting-out process may be easily available in most cases, except for special occasions.

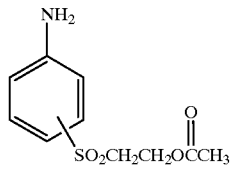

Formula 2

The process of synthesizing a dye in the presence of an aminophenyl-β-acetoxyethylsulfone compound, expressed by the following formula 2, requires less amount of salt than the conventional dye during the salting-out process which may contribute to reduced salt concentration of waste water. The introduction of aminophenyl-β-acetoxyethylsulfone group to the dye may minimize the loss of dye, since its low solubility in water lessens the amount of the remaining solution during filtration, thus contributing to further reduction of treatment cost on waste water. Further, a dye, so obtained, has a very high purity and low concentration of salt so that the concentration of salt in waste water may be reduced and the desalting process for manufacturing a liquid dye is quite easy.

The well-known compound expressed by the formula 2 have been disclosed in several literatures. Among related compounds, an manufacturing example for 4-aminophenyl-β-acetoxyethylsulfone (Japanese Unexamined Publication No. 81-22354, German Patent No. 2,929,107) is shown in the following scheme 1:

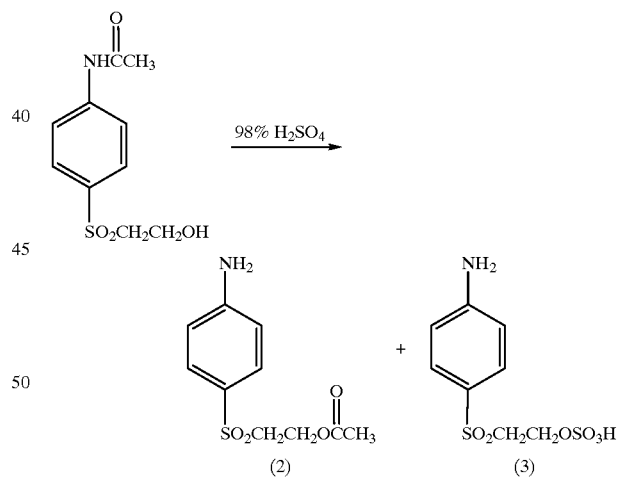

Scheme 1

Treatment of 98% sulfuric acid to 4-acetaminophenyl-β-hydroxyethylsulfone gives a compound where two compounds expressed by the formulae (2) and (3) are mixed in the ratio of 70:30. The dye containing the mixture, so synthesized, has been reported to show excellent properties of dye. However, if a dye is synthesized using a mixture obtained from the scheme 1, the presence of 4-aminophenyl-β-sulfatoethylsulfone is responsible for reduction of substantivity due to its a very high solubility to water.

Nonetheless, any efforts to synthesize a blue reactive dye expressed by the formula 1 has not been made using aminophenyl-β-acetoxyethylsulfone expressed by the formula 2.

SUMMARY OF THE INVENTION

The inventors have made intensive studies to generate a blue reactive dye with high yield and purity and as a result of this, have succeeded in synthesizing a blue reactive dye using aminophenyl-β-acetoxyethylsulfone and monochlorotriazine as reactive groups. Thus, this invention has been completed.

Therefore, an object of this invention is to provide a bifunctional blue reactive dye which has an excellent combination of properties such as reduced environmental pollution during the manufacture of a dye, more brightness in color, lower solubility to water, and higher dyeing yield.

DETAILED DESCRIPTION OF THE INVENTION

This invention relates to a bifunctional blue reactive dye expressed by the following formula 1:

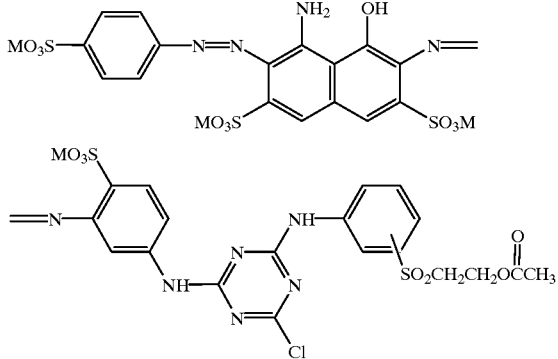

Formula 1

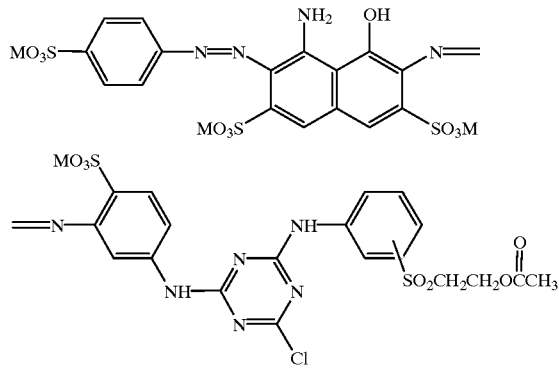

Formula 1 wherein, M is alkaline metal atom

This invention is also characterized by a process for preparing a bifunctional blue reactive dye expressed in the formula 1, which comprises the steps of:

(a) diazotizing p-sulfanyl acid and then coupling with neutralized solution of 1-naphthol-8-amino-3,6-disulfonic acid at pH 1–2 and 0–5° C.;

(b) condensing both neutralized solution of m-phenylenediamine-4-sulfonic acid and cyanuric chloride at 0–5° C.;

(c) diazotizing the condensate resulted from (b) and then coupling through addition of the resulting solution to the reacting solution of (a) at a time at 0–5° C.; and (d) coupling through addition of aminophenyl-β-acetoxyethylsulfone expressed by the following formula 2 to the resulting solution of (c).

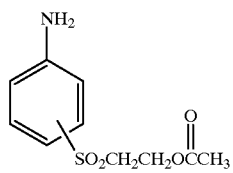

Formula 2 wherein, M is alkaline metal atom.

The process for manufacturing a bifunctional blue reactive dye expressed by the formula I is explained in more detail as set forth hereunder.

The first step is to diazonate p-sulfanyl acid and then couple with neutralized solution of 1-naphthol-8-amino-3, 6-disulfonic acid.

The diazotization is performed according to conventional method in such manner that p-sulfanyl acid is dispersed in water at 0–5° C. and then conc. hydrochloric acid and $NaNO_2$ are added to diazonate. The neutralized solution of 1-naphthol-8-amino-3,6-disulfonic acid is solution prepared in a manner that a base is added to 1-naphthol-8-amino-3, 6-disulfonic acid, thereby transforming sulfonic acid group (—$SO_3H$) of 1-naphthol-8-amino-3,6-disulfonic acid to sulfonic acid metal salt (—$SO_3M$). The bases conventionally used in this reaction are alkaline metal hydroxide and alkaline metal carbonate salt and preferably NaOH, LiOH, $Na_2CO_3$ and $Li_2CO_3$ are used. The amount of base is determined by equivalent rate to the amount of 1-naphthol-8-amino-3,6-disulfonic acid. Following the diazotization, the diazotized compound is slowly added to the above neutralized solution for the purpose of coupling reaction at pH 1–2 and 0–10° C., preferably 0–5° C. If the pH is lower than 1, the coupling reaction tends to be extremely slow; in the case of exceeding pH 2, the side reaction is generated. In addition, if the reaction temperature is lower than 0° C., the coupling reaction tends to be extremely slow; in the case of exceeding 10° C., the side reaction is occurred.

Seconds step is the condensation of neutralized solution of m-phenylenediamine-4-sulfonic acid with cyanuric chloride. The neutralized solution of m-phenylenediamine-4-sulfonic acid is prepared by the treatment of base to m-phenylenediamine-4-sulfonic acid (—$SO_3H$) to give sulfonic metal salt (—$SO_3M$). Care of keeping temperature 0–5° C. has to be taken to avoid the (generation of side products.

Third step is the coupling of first reaction mixture and second while keeping pH lower than 7 and temperature 0–5° C.

Forth step is the addition of aminophenyl-β-acetoxyethylsulfone to the third reaction mixture by increasing temperature gradually to 40–45° C. to yield the desired product, bifunctional blue reactive dye that contains two functional groups, monochlorotriazine and acetoxyethylsulfone. The product is obtained by salting-out.

In this invention, the source material, aminophenyl-β-acetoxyethylsulfone compound, shown in formula 2 is prepared by treatment of acetaminophenyl-β-hydroxyethylsulfone with solution of acetic acid containing hydrogen chloride.

As described above, aminophenyl-β-acetoxyethylsulfone shown in formula 2 is necessary to be introduced at the last reaction; if it is introduced at initial step, a large amount of undesirable side product is produced.

Impurities generated during the reaction are removed by salting-out to obtain the bright color of dye. Dye that contain aminophenyl-β-sulfatoethylsulfone as the functional group has a high solubility in water. It is difficult to carry salting-out for impurities that result in disadvantages in color and the amount of salt. In this invention, the red reactive dye is produced by the simple isolation, salting-out, with high purity and low concentration of salt and side products. This simple and easy isolation of the dye is favorable in operators and in making the liquid dye that can be measured accurately in the use of automatic process of dyeing. And also the filtrate has low concentration of the dye and salt in waste water that results in savings in cost. Aminophenyl-β-sulfatoethylsulfone compound contains sulfuric acid which is needed to be neutralized with an alkali in the coupling reaction while aminophenyl-β-acetoxyethylsulfone does not. This is another advantage in cost by not using of an alkali.

Dyeing by treatment of this bifunctional red reactive dye to cotton shows better dyeing yield, color yield and fastness than that by ordinary red reactive dyes.

The following specific examples are intended to be illustrative of the invention and should not be construed as limiting the scope of the invention as defined by appended claims.

MANUFACTURING EXAMPLE

Preparation of 4-aminophenyl-β-acetoxyethylsulfone

A mixture of 60 g (1 mol) of acetic acid and 1.8 g (0.1 mol) of water was added to a 100 ml flask equipped with a condenser with a balloon and then 5.5 g (0.15 mol) of hydrogen chloride gas was slowly injected to a reaction solution for 1.5–2 hours, while maintaining the temperature at 15° C. 24.3 g (0.1 mol) of 4-acetaminophenyl-β-hydroxyethylsulfone was added to the mixture, heated slowly to 70–75° C. for 1 hour and stirred for 9 hours.

The reaction mixture was cooled down to room temperature, filtered, and washed with 5 ml of acetic acid two times. The solid, so filtered, was dried under the vacuum at 60° C., dissolved in a mixture of ice (10 g) and water (25 ml) and neutralized with 15% sodium carbonate in aqueous solution for filtration of crystals. The filtrate was washed with water (5 ml) three times and dried to give a pure form of 4-aminophenyl-β-acetoxyethylsulfone as a white solid (84.8%, purity 97.5%). m.p.: 92–93° C.

Step (a)

To the solution of p-sulfanylic acid (5.20 g, 0.03 mol) in water (60 ml) was added 35% HCl (5.21 ml, 0.06 mol) while keeping temperature 0–5° C. Ice (10 g) was added, followed by $NaNO_2$ (10 ml, 3N, 0.03 mol). The reaction mixture was stirred for 1h at end of which time the excess of $HNO_2$ was decomposed by sulfamic acid. To 1-naphthol-8-amino-3,6-disulfonic acid (9.57 g, 0.03 mol) in a separate flask dissolved in water (40 ml) was added 4N of aqueous NaOH solution to neutralize. This neutralized reaction mixture was added gradually to diazotized solution while keeping pH 1–2. The combined reaction mixture was stirred for 3 h to give the product.

Step (b)

To m-phenylenediamini4-sulfonic acid (6.21 g, 0.033 mol) dissolved in water (40 ml) was added 4N of aqueous NaOH solution (8.253 ml) to neutralize. To cyanuric chloride (5.99 g, 0.033 mol) in a separate flask dissolved in water (60 ml) was added ice (10 g) and m-phenylenediamini-4-sulfonic acid solution gradually while keeping the temperature between 0–5° C. over 1 h. The reaction mixture was stirred for additional 0.5 h to complete the reaction.

Step (c)

To the condensed solution prepared in Step (b) was added 35% HCl (6.88 ml, 0.0792 mol) while keeping the temperature between 0–5° C. Ice (10 g) was added, followed by $NaNO_2$ (11.0 ml, 3N, 0.03 mol). The reaction mixture was stirred for 1 h, at end of which time sulfamic acid was added to decompose the excess $HNO_2$.

To the monoazonated solution, prepared in Step (a), was added ice (10 g) and diazotized solution. The temperature was maintained between 0–5° C. After stirring for 10 min, 15% of sodium carbonate solution (40 ml) was slowly added over 30 min while keeping pH lower than 7. The reaction mixture was stirred for additional 2 h.

Step (d)

To the aqueous solution of bisazo compound, prepared in Step (c), was added 4-aminophenyl-β-acetoxyethylsulfone (8.03 g, 0.033 mol) over 1 h while keeping the temperature 40–45° C. and pH 3–5. The reaction mixture was stirred for additional 2 h at end of which time pH was adjusted to 7.5. $KH_2PO_4$ was added to make pH 6.0–6.5 again to yield the blue reactive dye which was salted-out, filtered and dried.

$^1$H-NMR (300 MHz, DMSO-$d_6$): d 1.78 (3H, s), 3.70 (2H, t), 4.27 (2H, t), 7.04(1H, d), 7.44 (1H, s), 7.47 (1H, s), 7.64 (1H, d), 7.71 (2H, d), 7.84 (2H, d), 7.93 (1H, s), 7.99(2H, d), 8.28 (2H,d), 9.19 (1H, s), 10.48 (1H, s), 10.57 (2H, br s), 11.57 (1H, br s).

Example 1

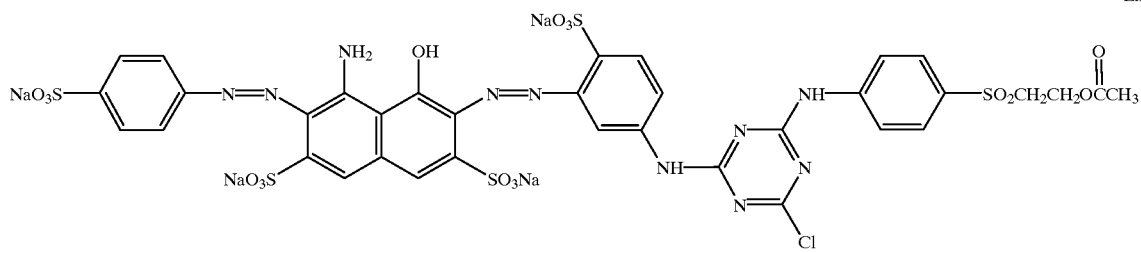

Example 2

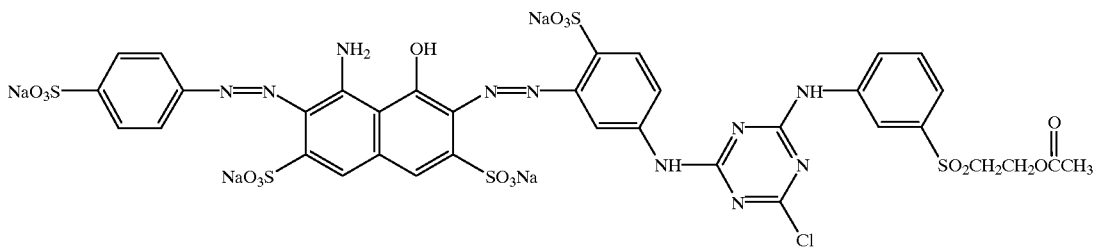

Step (a)

To the solution of p-sulfanylic acid (5.46 g, 0.0315 mol) in water (50 ml) was added 35% HCl (5.48 ml, 0.063 mol) while keeping temperature 0–5° C. Ice (10 g) was added, followed by $NaNO_2$ (10.5 ml, 3N, 0.0315 mol). The reaction mixture was stirred for 1 h at end of which time the excess of $HNO_2$ was decomposed by sulfamic acid. To 1-naphthol-8-amino-3,6-disulfonic acid (9.58 g, 0.03 mol) in a separate flask dissolved in water (40 ml) was added aqueous NaOH solution to neutralize. This neutralized reaction mixture was added gradually to diazotized solution while keeping pH 1–2. The combined reaction mixture was stirred for 3 h to give the product.

Step (b)

To m-phenylenediamini-4-sulfonic acid (6.21 g, 0.033 mol) dissolved in water (40 ml) was added 4N of aqueous NaOH solution (8 ml) to neutralize. To cyanuric chloride (6.6 g, 0.036 mol) in a separate flask dissolved in water (40 ml) was added ice (10 g) and m-phenylenediamini-4-sulfonic acid solution gradually while keeping the temperature between 0–5° C. over 1 h. The reaction mixture was stirred for additional 0.5 h to complete the reaction.

Step (c)

To the condensed solution prepared in Step (b) was added 35% HCl (6.88 ml, 0.0792 mol) while keeping the temperature between 0–5° C. Ice (10 g) was added, followed by $NaNO_2$ (11.0 ml, 3N, 0.033 mol). The reaction mixture was stirred for 1 h, at end of which time sulfamic acid was added to decompose the excess $HNO_2$.

To the monoazonated solution, prepared in Step (a), was added ice (10 g) and diazotized solution. The temperature was maintained between 0–5° C. After stirring for 10 min, 15% of sodium carbonate solution (40 ml) was slowly added over 30 min while keeping pH lower than 7. The reaction mixture was stirred for additional 2 h.

Step (d)

To the aqueous solution of bisazo compound, prepared in Step (c), was added 4-aminophenyl-β-acetoxyethylsulfone (8.81 g, 0.0315 mol) over 1 h while keeping the temperature 40–45° C. and pH 4–5. The reaction mixture was stirred for additional 1 h at end of which time pH was adjusted to 7.5. $KH_2PO_4$ was added to make pH 6.0–6.5 again to yield the blue reactive dye which was salted-out, filtered and dried.

$^1$H-NMR (300 MHz, DMSO-$d_6$): d 1.79(3H, s), 3.81(2H, t), 4.31(2H, t), 7.07(1H, d), 7.49(1H, d), 7.56–7.68(3H, m), 7.74(2H, d), 8.00 (2H, d), 8.33 (1H, d), 8.62 (1H, s), 9.23 (1H, s), 10.48 (2H, s), 10.59 (1H, s), 11.52 (1H, s), 10.20 (1H, s)), 11.57(1H, br s)

COMPARATIVE EXAMPLE

A blue reactive dye was prepared in the same manner as Example 1, except that 4-aminophenyl-β-sulfatoethylsulfone was used instead of 4-aminophenyl-β-acetoxyethylsulfone.

EXPERIMENTAL EXAMPLE

After the blue reactive dye synthesized in example 1 and 2 was dyed to cotton, the dyeing yield and fastness were measured. The percentages of dyeing exhaustion were measured by equation 1.

$$[(1-(A/A_0)]\times 100 \qquad \text{Equation 1}$$

wherein, $A_0$ is an absorbance of dye bath before dyeing; A is the sum of absorbance after dyeing and washing.

TABLE 1

| Category | | Example 1 | Example 2 | Comparative example |
|---|---|---|---|---|
| Dyeing Yield (%) | 1% o.w.f. | 91.2 | 90.5 | 86.4 |
| | 2% o.w.f. | 90.1 | 89.1 | 84.9 |
| | 3% o.w.f. | 87.2 | 86.4 | 81.6 |
| Light fastness* (%) | 1% o.w.f. | 3–4 | 3–4 | 3–4 |
| | 3% o.w.f. | 4–5 | 4–5 | 4–5 |

*measured in accordance with KS K 0218 direct radiation method

From the table 1, it was noted that a dyeing material, which was prepared from the blue reactive dye of this invention (example 1 and 2), showed a very high dyeing yield, compared with that of the conventional blue reactive dye (comparative example) due to the different functional groups in spite of the same structure. The light fastness was same in grade but less change of color was observed from the red reactive dye of this invention. Also, the blue reactive dye of this invention was excellent in terms of a washing fastness (KS K 030 A-4), perspiration(acidity, alkalineness) fastness (AATCC Method 14) and chloride fastness (JIS-0884–1983) which were in all $5^{th}$ grade. The levelness of dyeing and reproducibility was excellent.

As described above, it is noted that the blue reactive dye with bifunctional groups such as monochlorotriazine and acetoxyethylsulfone has an excellent combination of properties such as reduced environmental pollution during the manufacture of a dye, more brightness in color, lower solubility to water, and higher dyeing yield.

What is claimed is:

1. A bifunctional blue reactive dire expressed by the following formula 1:

Formula 1

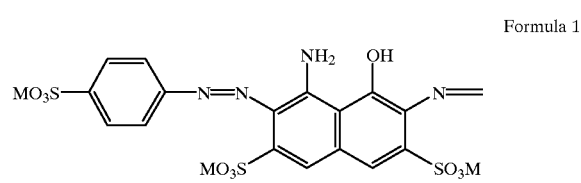

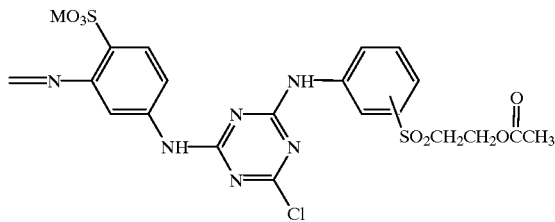

wherein, M is alkaline metal atom.

2. A process for preparing a bifunctional blue reactive dye expressed in the formula 1, which comprises the steps of:

(a) diazotizing p-sulfanyl acid and then coupling with neutralized solution of 1-naphthol-8-amino-3,6-disulfonic acid at pH 1–2 and 0–5° C.;

(b) condensing both neutralized solution of m-phenylenediamine-4-sulfonic acid and cyanuric chloride at 0–5° C.;

(c) diazotizing the condensate resulted from (b) and then coupling through addition of the resulting solution to the reacting solution of (a) at a time at 0–5° C.; and (d) coupling through addition of aminophenyl-β-acetoxyethylsulfone expressed by the following formula 2 to the resulting solution of (c):

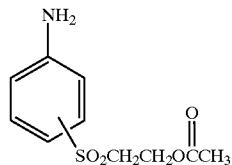

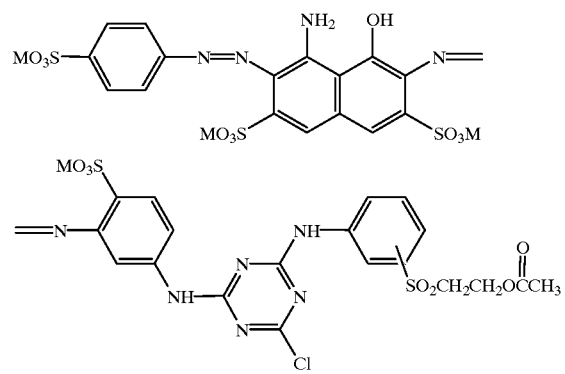

wherein, M is alkaline metal atom.

* * * * *

UNITED STATES PATENT AND TRADEMARK OFFICE
CERTIFICATE OF CORRECTION

PATENT NO. : 6,307,033 B1
DATED : October 23, 2001
INVENTOR(S) : Sea Wha Oh et al.

It is certified that error appears in the above-identified patent and that said Letters Patent is hereby corrected as shown below:

<u>Column 8, claim 1,</u>
Line 57, change "dire" to -- dye --.

Signed and Sealed this

Fifth Day of March, 2002

*Attest:*

JAMES E. ROGAN
*Attesting Officer*     *Director of the United States Patent and Trademark Office*